United States Patent
Leszczenski et al.

(10) Patent No.: US 9,519,639 B2
(45) Date of Patent: Dec. 13, 2016

(54) COMMUNITY TRANSLATION OF USER-GENERATED CONTENT

(75) Inventors: James M. Leszczenski, Sunnyvale, CA (US); Hao Xu, Palo Alto, CA (US); Javier Olivan Lopez, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1046 days.

(21) Appl. No.: 13/492,621

(22) Filed: Jun. 8, 2012

(65) Prior Publication Data

US 2013/0332143 A1 Dec. 12, 2013

(51) Int. Cl.
*G06F 17/28* (2006.01)
*G06F 17/00* (2006.01)
*G06Q 10/06* (2012.01)

(52) U.S. Cl.
CPC ....... *G06F 17/2836* (2013.01); *G06F 17/2854* (2013.01); *G06Q 10/06* (2013.01)

(58) Field of Classification Search
CPC .................................................. G06F 17/289
USPC ........................................................... 704/2
See application file for complete search history.

(56) References Cited

U.S. PATENT DOCUMENTS

| | | | |
|---|---|---|---|
| 6,272,456 B1 * | 8/2001 | de Campos | 704/8 |
| 7,983,897 B2 | 7/2011 | Chin et al. | |
| 8,271,260 B2 | 9/2012 | Wong et al. | |
| 8,504,352 B2 | 8/2013 | Wong et al. | |
| 8,756,050 B1 * | 6/2014 | Harkness et al. | 704/2 |
| 2002/0193986 A1 | 12/2002 | Schirris | |
| 2003/0023422 A1 * | 1/2003 | Menezes et al. | 704/2 |
| 2004/0041836 A1 | 3/2004 | Zaner et al. | |
| 2005/0021323 A1 | 1/2005 | Li | |
| 2007/0294076 A1 * | 12/2007 | Shore et al. | 704/2 |
| 2008/0059145 A1 * | 3/2008 | Wood et al. | 704/2 |
| 2008/0147378 A1 | 6/2008 | Hall | |
| 2009/0024595 A1 | 1/2009 | Chen | |
| 2009/0198487 A1 * | 8/2009 | Wong et al. | 704/4 |
| 2009/0306959 A1 * | 12/2009 | Rappoport et al. | 704/2 |
| 2011/0046939 A1 * | 2/2011 | Balasaygun | 704/2 |
| 2012/0209587 A1 * | 8/2012 | Tanaka et al. | 704/2 |

(Continued)

OTHER PUBLICATIONS

Australian Government—IP Australia, Patent Examination Report No. 1, Australian Patent Application No. 2008333773, Aug. 30, 2012, 3 Pages.

(Continued)

*Primary Examiner* — Huyen Vo
*Assistant Examiner* — Timothy Nguyen
(74) *Attorney, Agent, or Firm* — Fenwick & West LLP

(57) ABSTRACT

Translations for items of user-generated content are received from one or more users associated with a social networking system and/or one or more machine-generated translations. Each translation may translate a content item from a source or original language to a target language. Votes regarding the suitability of the translations are received from one or more users. In one aspect, the option to provide translations and/or vote on translations is provided to those users that are determined to be competent in the source language of the item of user-generated content. Determination of whether a user is competent in the source language can be based on the user profile of the user, the user-generated content of the user, the language competencies of the user's connections, and/or other social signals.

9 Claims, 4 Drawing Sheets

(56) References Cited

U.S. PATENT DOCUMENTS

2012/0310624 A1* 12/2012 Wong et al. .................. 704/4
2015/0161227 A1* 6/2015 Buryak et al. ................. 704/8

OTHER PUBLICATIONS

Canadian Intellectual Property Office, Office Action, Canadian Patent Application No. 2,705,133, Mar. 1, 2012, 2 pages.
European Patent Office, "Notice from the European Patent Office dated Oct. 1, 2007 Concerning Busness Methods," *Official Journal of the European Patent Office*, Nov. 1, 2007, pp. 592-293, vol. 30, No. 1.
European Patent Office, Supplementary European Search Report, Application No. EP 08858370.2, Oct. 18, 2010, 6 pages.
PCT International Preliminary Report on Patentability, PCT Application No. PCT/US2008/085727, Jun. 8, 2010, 6 pages.
PCT International Search Report and Written Opinion, PCT/US2008/085727, Feb. 12, 2009, 9 Pages.
The State Intellectual Property Office of the People's Republic of China, First Office Action, Chinese Patent Application No. 2008-80119336.2, Aug. 15, 2011, 8 pages.
The State Intellectual Property Office of the People's Republic of China, Rejection Decision, Chinese Patent Application No. 200880119336.2, Jul. 18, 2012, 9 pages.

* cited by examiner

COMMUNITY TRANSLATION OF USER-GENERATED CONTENT

BACKGROUND

This invention relates to social networks and in particular to the community translation of user-generated content over a social networking system.

Social networks, or social utilities that track and enable connections between users (including people, businesses, and other entities), have become prevalent in recent years. In particular, a social networking system allows users to communicate information more efficiently. For example, a user may post contact information, background information, job information, hobbies, and/or other user-specific data to a location associated with the user on a social networking system. Other users can then review the posted data by browsing user profiles or searching for profiles including specific data. A social networking system also allows users to associate themselves with other users, thus creating a web of connections among the users of the social networking system. These connections among the users can be used by the social networking system to offer more relevant information to each user in view of the users' own stated interests.

Various users of a social networking system may be competent in different languages (e.g., French, English). As a result, a user may not be able to understand information posted by another user if that posted information is not in a language known by the user. Such language barriers may reduce the range of useful connections that a user may make with other users. Also, a user may not be able to understand text provided by the social networking system itself if the language of that text is not known to the user. This text may include instructions, menu items, and button labels (e.g., "Click to submit") provided by the social networking system.

At present, operators of social networking systems manually translate text into various desired languages. However, performing such translations require great effort and expense on the part of the system operators. As a result, much content currently available on social networking systems are not translated. As such, many users of social networking systems who need translations are not able to properly use the social networking systems and/or are not able to communicate with users who use different languages.

SUMMARY

Embodiments of the invention are directed to the community translation of items of user-generated content by a social networking system. In particular, translations for items of user-generated content can be obtained from various users associated with the social networking system and/or from one or more machine translation sources. Each translation may translate an item of user-generated content from its source or original language to a target language. For example, a translation may translate a content item from Spanish to English. The obtained translations can thereafter be provided to subsequent viewers of the items of user-generated content, as needed. In this way, communication of user-generated content over the social networking system can be improved.

In one embodiment, various users are provided with the option to translate an item of user-generated content based on whether the language competencies of the users include the item's source or original language. In particular, for each individual user, the social networking system determines those languages in which the user is competent. Such a determination can be based on the user profile of the user, the content generated by the user, the language competencies of the user's connections (e.g., friends, fans, etc.) and/or other social signals. If it is determined that the user is competent in the source language as well as in another language, the user is given the option to provide a translation for the item of user-generated content from the source language to the other language.

In one embodiment, the social networking system additionally provides various users with the option to vote on previously obtained translations for an item of user-generated content. The votes from the users can be used to compute quality ratings for the translations. The quality ratings can then be used to select those translations to present to subsequent viewers of the content item. In one embodiment, a user is provided with the option to vote on translations based on whether the language competencies of the user include the item's source language and another language. By providing the option to provide and/or vote on translations to suitable candidates, the translations and/or votes received by the system can be of higher quality.

In one embodiment, the social networking system automatically acquires machine-generated translations immediately following or shortly after receiving an item of user-generated content. In doing so, translations can be provided to viewers soon after the item is posted. In one embodiment, the social networking system does not provide a machine-generated translation once a suitable user-generated translation is obtained.

The features and advantages described in this summary and the following detailed description are not all-inclusive. Many additional features and advantages will be apparent to one of ordinary skill in the art in view of the drawings, specification, and claims hereof.

Figure 1:
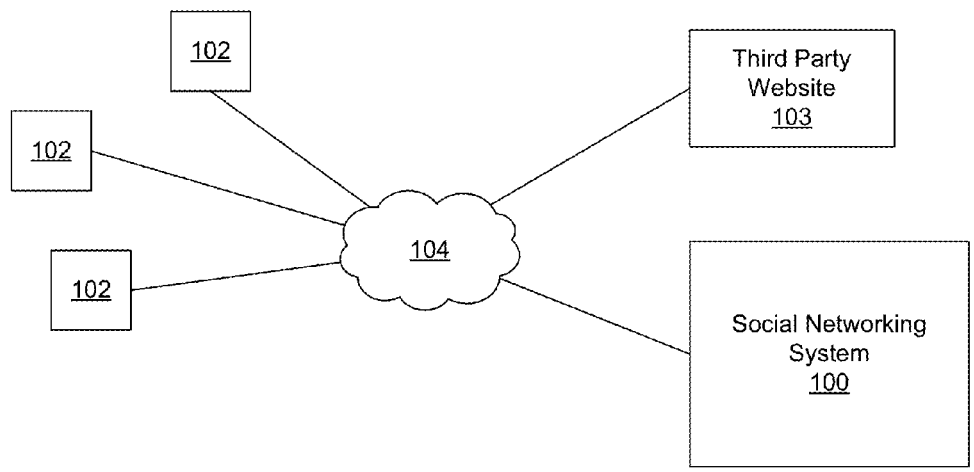
FIG. 1 is a high level block diagram illustrating a system environment suitable for operation of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

In addition to interactions with other users, the social networking system provides users with the ability to perform various types of activities with social networking objects supported by the system. A social networking object can represent a variety of things, including, without limitation, profiles, applications (e.g., games playable within the social networking system), events (e.g., a page representative of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, etc. A user can interact with a social networking object by associating with the object or performing an action on the object. For example, a user can interact with an object by joining a group, attending an event, checking-in to a location, becoming a fan of an organization's fan page, "liking" a fan page, posting to a fan page, etc. These are just a few examples of the objects upon which a user may act on in a social networking system, and many others are possible.

In one embodiment, a social networking system enables the community translation of items of user-generated content from one or more source languages to one or more target languages. As used herein, the source language of a given content item refers to the original language of the item as the item is posted. As also used herein, a target language refers to a language to which a given content item is to be translated. In one aspect, translations for items of user-generated content are obtained from one or more users associated with the social networking system and/or from one or more machine translation sources. The obtained translations can thereafter be provided to subsequent viewers of the items of user-generated content, as needed. In this way, communication of user-generated content over the social networking system can be improved.

In one embodiment, the social networking system provides various users with the option of providing translations for items of user-generated content. In one embodiment, a user is provided with the option to translate an item of user-generated content based on whether language competency information for the user includes the item's source language and a primary or preferred language for the user, where the primary language is different from the source language. As used herein, the language competency information for a particular user can include a list of those languages in which it has been determined the user is competent. For example, the language competency information for a user may list English, Spanish, and Chinese.

The social networking system can determine the language competency information for a given user in any suitable manner. The language competency information can be determined based on, for example, the information included in the user profile of the user, the language of the text in the user profile, the language of the content generated by the user, the language competency information of the user's connections (e.g., friends, fans, etc.) and/or other social signals. If the determined language competency information includes the source language and a primary language for the user different from the source language, the user is given the option to provide a translation for the item. The translation can translate the item from the source language to the user's primary language. In this way, the social networking system is able to limit the receipt of translations to those users that are capable of correctly translating an item. As a result, the social networking system may more likely obtain accurate and/or higher quality translations.

In one embodiment, the social networking system additionally provides various users with the option to vote on previously obtained translations for an item of user-generated content. The votes received from the users can be used to select suitable translations to present to subsequent viewers of the content item, as needed. More specifically, based on the votes received from the users, the social networking system can compute quality ratings for the obtained translations. The translation having the highest quality rating for each target language can thereafter be presented to subsequent viewers of the item, as needed. In one embodiment, a user is provided with the option to vote on translations based on whether the language competency information for the user includes the item's source language and a primary language different from the source language. The translations on which the user can vote may each translate the item from the item's source language to the primary language of the user. In this way, the social networking system is able to restrict voting to those users that are likely capable of correctly identifying suitable translations. As a result, the social networking system may more likely present higher quality translations to subsequent viewers.

In one embodiment, the social networking system provides a user interface for facilitating the translation of an item of user-generated content to a user. In the embodiment, the user interface includes the item of user-generated content to be translated as posted in its source language. The user interface additionally includes an initial translation for the item of user-generated content. The translation may either be a translation previously obtained from another user or a translation retrieved from a machine translation source. The translation may be selected based on a determined primary language for the user. For example, the social networking system may determine that the user's primary language is English. As a result, the social networking system may retrieve a translation of the item of user-generated content for the English language.

In one embodiment, the user interface includes a translation input element. The translation input element enables a user to provide a translation for the item of user-generated content, and/or vote on one or more previously obtained translations. In particular, the translation input element may include a suitable input mechanism (e.g., a text box) for receiving a user-generated translation. In one embodiment, the translation input element additionally includes a suitable voting mechanism (e.g., a set of buttons) for voting on previously obtained translations. Specifically, a user can interact with the voting mechanism to vote on a suitable translation from a list of previously obtained translations for the item of user-generated content. In one embodiment, the translation input element is provided for display to a user if it is determined that the language competency information for the user includes the source language.

In one embodiment, the social networking system initially obtains one or more machine-generated translations for an item of user-generated content immediately after or following a predefined period of time after posting of the item. In doing so, translations can be provided to viewers after the item of user-generated content is posted, but before the receipt of a user provided translation. In one embodiment, the social networking system does not provide machine-generated translations once a suitable user-generated translation is obtained.

In one embodiment, the social networking system obtains one or more translations for an item of user-generated content from an owner of the user-generated content to be translated. For example, content to be translated on the official page of an actor may be translated by the owner of the page into one or more languages. The resulting translations of the content may be considered official translations. As such, the official translations may override translations from all other sources.

System Architecture

FIG. 1 is a high level block diagram illustrating a system environment suitable for operation of a social networking system 100. The system environment includes one or more client devices 102, one or more third-party websites 103, a social networking system 100, and a network 104. While only three client devices and one third-party website are shown in FIG. 1, it should be appreciated that any number of these entities (including millions) can be included. In alternative configurations, different entities can also be included in the system.

The network 104, in general, can be any network, including but not limited to any combination of the Internet, a mobile network, a LAN, a wired or wireless network, a private network, and/or a virtual private network.

The client devices 102 include one or more computing devices that can receive user input and can transmit and receive data via the network 104. For example, the client devices 102 may be desktop computers, laptop computers, tablet computers (pads), smart phones, personal digital assistants (PDAs), or any other device including computing functionality and data communication capabilities. The client devices 102 are configured to communicate via network 104, which may include any combination of local area and/or wide area networks, using both wired and wireless communication systems. The client devices 102 can provide a means by which various users can communicate with the social networking system 100. The third party website 103 is coupled to the network 104 in order to communicate with the social networking system 100.

The social networking system 100 includes a computing system that allows users to communicate or otherwise interact with each other and access content as described herein. In one embodiment, the social networking system 100 stores various types of content, including user-generated content. For example, the social networking system 100 can store user profiles that describe the users of a social network, including biographic, demographic, and other types of descriptive information, such as work experience, educational history, hobbies or preferences, location, and the like. The social networking system 100 can additionally store other objects, such as fan pages, events, groups, advertisements, general postings, etc.

Figure 2:
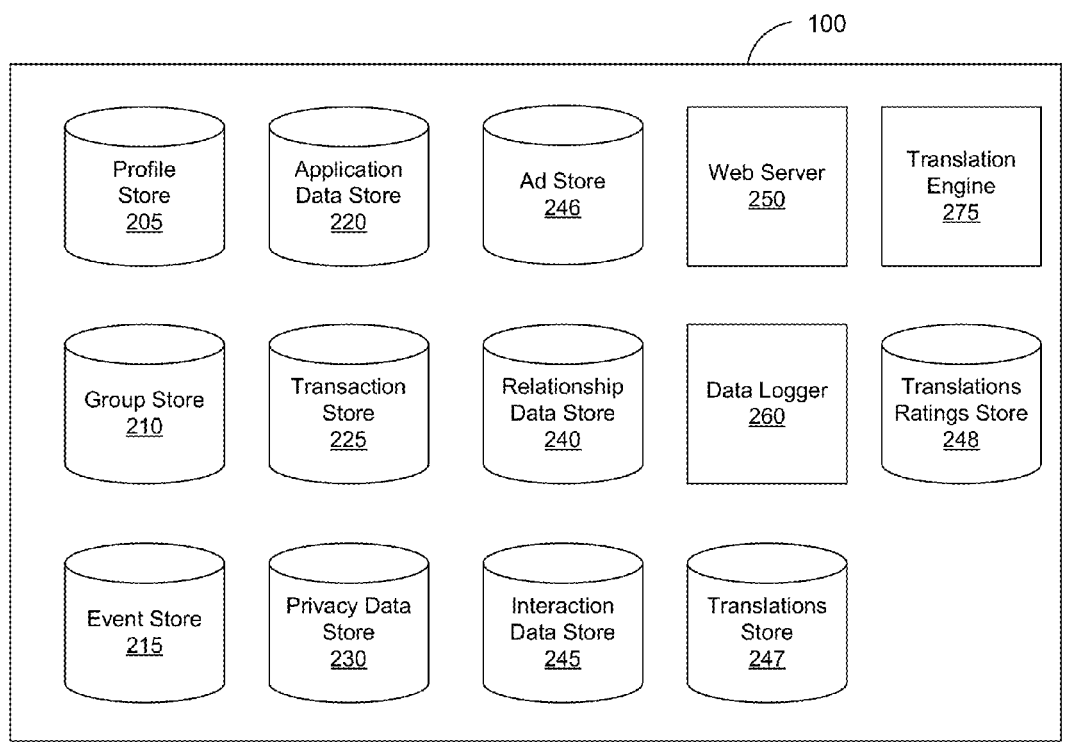
FIG. 2 is a block diagram of various components of a social networking system, in accordance with an embodiment of the invention.

FIG. 2 is an example block diagram of various components of the social networking system 100. The social networking system 100 includes a web server 250, a data logger 260, a translation engine 275, a profile store 205, a group store 210, an event store 215, an application data store 220, a transaction store 225, a privacy data store 230, a relationship data store 240, an interaction data store 245, an ad store 246, a translations store 247, and a translations ratings store 248. In alternative configurations, different components can be included in the system 100.

In general, the web server 250 links the social networking system 100 via the network 104 to one or more of the client devices 102, as well as to one or more third party websites 103. The web server 250 may include a mail server or other messaging functionality for receiving and routing messages between the social networking system 100 and the client devices 102 or third party websites 103. The messages can be instant messages, queued messages (e.g., email), text and SMS messages, or any other suitable messaging technique. In one embodiment, the web server 250 can receive requests for user-generated content from the one or more client devices 102 or the one or more third party websites 103. For example, the web server 250 may receive a request for a particular a user-generated comment from a client 102.

The translation engine 275 facilitates the community translation of items of user-generated content. As used herein, an item of user-generated content can be any suitable content produced by a user. For example, an item of user-generated content can be a text-based user-generated post, comment, status update, question, review, message, and/or the like. An item of user-generated content may be produced by any suitable user associated with the social networking system 100. For example, an item of user-generated content can be generated by a user of the social networking system 100 or a user of a third party website 103 connected to the social networking system 100.

In one embodiment, the translation engine 275 receives items of user-generated content from one or more users associated with the social networking system 100. For example, a user of the social networking system 100 may publish a wall post to a fan page of a particular company. Upon receiving each content item, the translation engine 275 automatically obtains one or more machine-generated translations for the item. Each translation may translate the item to a certain target language. For example, a first translation may translate the item to Spanish. A second translation may translate the item to Korean. In one embodiment, the translation engine 275 may generate the machine-generated translations using a suitable translation algorithm. In another embodiment, the translation engine 275 may obtain the machine-generated translations from one or more suitable machine translation sources. For example, the translation engine 275 may obtain the one or more translations from Microsoft's Bing Translator service. The obtained machine-generated translations for the items can thereafter be stored in the translations store 247.

In one embodiment, the translation engine 275 provides an option to translate an item of user-generated content and/or vote on previously obtained translations to a user. The option to translate the item may be provided in conjunction with a request to view the item initiated by a suitable user. More specifically, the translation engine 275 may receive a request, from a user, for a particular item of user-generated content. In response to receiving the request, the translation engine 275 determines the source language of the item of user-generated content. The source language may be determined in any suitable manner. For example, the translation engine 275 may analyze the text of the item of user-generated content by applying a suitable algorithm to determine the item's source language. Thereafter, the translation engine 275 determines the language competency information for the user. The language competency information may indicate the languages in which the user is determined to be competent. The language competency information may further indicate a primary or preferred language for the user.

In one embodiment, the language competency information is determined based on information included in the user profile of the user. For example, the user's profile may include a languages section indicating that the user is competent in English and Spanish. As a result, the language competency information may list both English and Spanish as languages in which the user is competent.

In one embodiment, the language competency information is determined based on the languages used in the user profile of the user. For example, the translation engine 275 may determine that because the user's profile includes both French and English, the user is competent in both languages. As a result, the language competency information may include both French and English. In one embodiment, the translation engine 275 may determine that the user is competent in a language identified in his or her user profile if usage of the language in the profile exceeds a certain usage threshold or percentage. For example, if thirty-percent or more of the user's profile is in English, the translation engine 275 may determine that that user is competent in English.

In one embodiment, the language competency information is determined based on the various connections and/or other social signals for the user. For example, the language competency information may be determined based on the language competency information for the user's friends. Illustratively, the language competency information for the user's friends may indicate that the user's friends are primarily competent in Spanish. As a result, the language competency information for the user may include Spanish. In one embodiment, the translation engine 275 may determine that the user is competent in a language if the language is determined to be known by at least a certain usage threshold or percentage of the user's friends as indicated by the friends' language competency information.

In one embodiment, the language competency information is determined based on the languages of the various user-generated content produced by the user. For example, the language competency information may be determined by identifying the languages used in the various communications (e.g., instant messages) exchanged between the user and other users. The language competency information may alternatively or additionally be determined by identifying the different languages used in the comments, status updates, posts, and/or the like generated by the user. In one embodiment, the translation engine 275 may determine that the user is competent in a language identified in user's content if usage of the language in the content exceeds a certain usage threshold or percentage.

In one embodiment, the language competency information for the user can be determined using any suitable combination of the techniques described above. For example, the language competency information may be determined based on the languages used in the user's profile and on the languages used in the content generated by the user. As another example, the language competency information may be determined based on the languages understood by the user's friends, and on the languages used in the communications exchanged between the user and his or her friends.

In one embodiment, the language competency information for the user may indicate a primary language for the user. The translation engine 275 may determine the primary language for the user in any suitable manner. For example, the translation engine 275 may identify, as the primary language, the language most frequently used by the user out of the various languages listed in the user's language competency information. As another example, the user may have previously indicated in his or her user profile a primary language. In the example, the translation engine 275 retrieves the user profile in order to determine the user's primary language.

In one embodiment, the translation engine 275 provides the user with a translation input element if it is determined that the user's primary language is different from the source language of the content item, and if it is determined that the user also is competent in the source language. For example, a user's primary language may be English, but the user may also understand the Spanish language. Such a determination may be based on the language competency information previously determined for the user.

In one embodiment, the translation input element includes a suitable input mechanism for receiving a translation from the user. The input mechanism may include a text box, a dropdown menu, a set of radio buttons, and/or the like. The user can interact with the input mechanism in order to provide a translation for the item of user-generated content from the source language to the primary language of the user. The received translation can be provided to other users such that the users can understand the item of user-generated content. In one embodiment, the translation input element includes a suitable voting mechanism for receiving votes. More specifically, the voting mechanism can include a list of previously obtained translations. The voting mechanism can additionally include a set of buttons or other similar voting elements for the list of previously obtained translations. The user can interact with the buttons in order to vote for a particular translation.

In one embodiment, the votes received for each translation can be used to compute quality ratings for the translations. The computed quality ratings may be used to select the translations to be presented to subsequent viewers of the item of user-generated content. In one embodiment, the quality rating for a particular translation is computed based on the number and quality of votes received from one or more different users. More specifically, the translation engine 275 can assign a weight to each received vote for a particular translation. The weight of each vote may be representative of the user's credibility and the user's translation ability. For example, a vote by a user who has previously submitted a translation that has received a relatively high number of votes may be assigned a larger weight than a vote by a user who has received a relatively low number of votes for a submitted translation. Votes with higher weights may have a greater effect on the quality rating determined for the translation. In one embodiment, the translation engine 275 can compute a quality rating for the translation based on the weighted votes. For example, the translation engine 275 can sum the weighted votes for each translation to compute the quality rating for the translation.

The computed quality rating for each translation can be used to select a particular translation for display to subsequent viewers of the item of user-generated content. For example, a subsequent viewer may request the item of user-generated content. The translation engine 275 may determine that the primary language of the viewer, as specified by the viewer's language competency information, is different from the source language of the requested item. As such, a particular translation for the item can be selected for presentation to the viewer based on the computed quality rating for the translation. In one embodiment, a translation with a higher quality rating is preferred over a translation with a lower quality rating when choosing a translation to provide to users. The quality rating may, in some embodiments, take into account various other factors to make it more customized to the viewer being provided with a translation. For example, a particular viewer may have several friends over the social networking system 100. The viewer may consider these friends more trustworthy than other users of the social networking system that the viewer does not know. As a result, votes from friends of the viewer may be more heavily weighted than votes from others. In one embodiment, only votes from friends of a viewer are considered in determining a weighted quality score.

In one embodiment, the translation engine 275 may receive one or more translations for an item of user-generated content from an owner of the user-generated content. For example, content to be translated on the official page of an actor may be translated by the owner of the page into one or more languages. The resulting translations of the content may be considered official translations. In one embodiment, the official translations for an item of user-generated content may override translations from all other sources. Thus, when a viewer requires a translation of the item, the translation engine 275 identifies whether an official translation has been obtained for the language of the viewer. If an official translation has been received for the language, the translation engine 275 retrieves the official translation. If an official translation has not been received, the translation engine 275 can select a translation (either machine generated or user provided) in the manner described previously.

Method for Facilitating Community Translation

Figure 3:
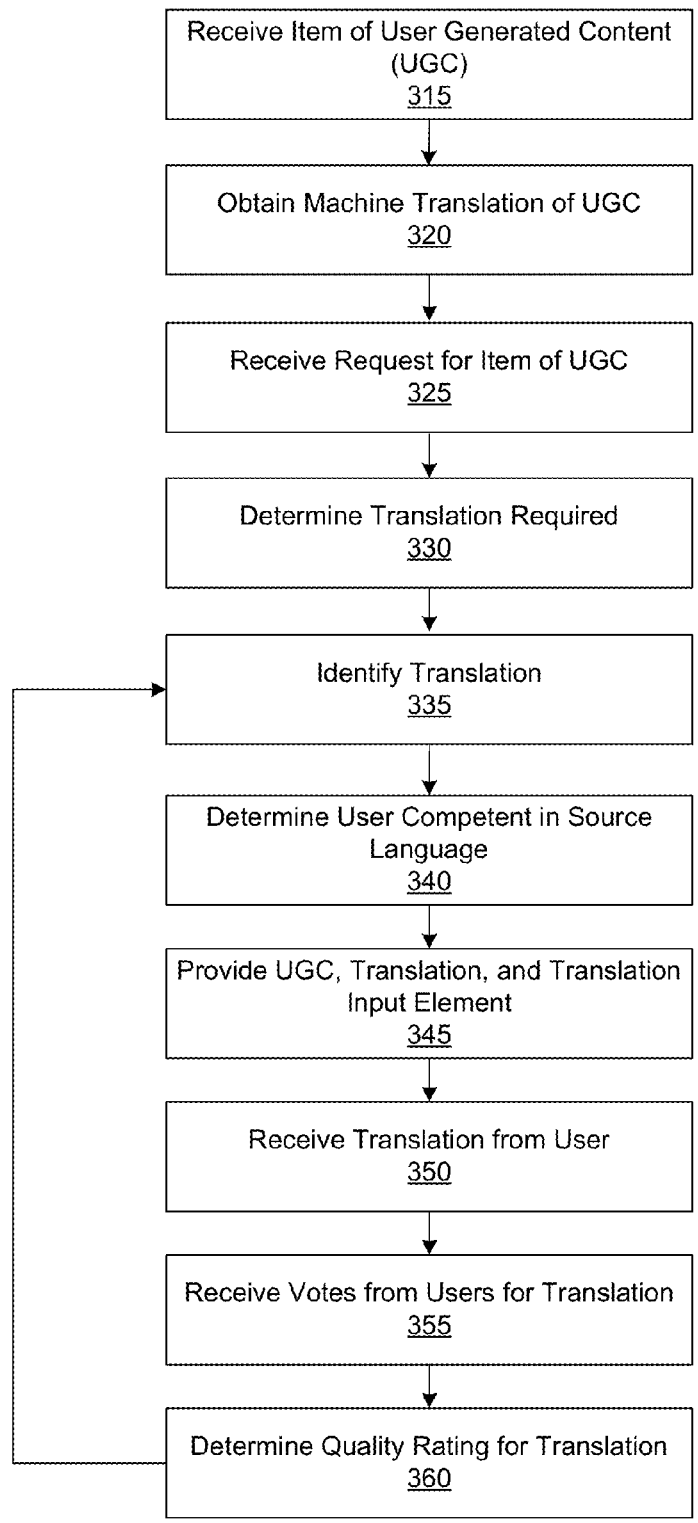
FIG. 3 is a flow chart of a process for facilitating the community translation of an item of user-generated content, in accordance with an embodiment of the invention.

FIG. 3 illustrates one embodiment of a process for facilitating the community translation of user-generated content. Other embodiments can perform the steps of the method in different orders and can include different, additional and/or fewer steps. The process shown in FIG. 3 may be performed by the social networking system 100 shown in FIG. 1.

As shown in FIG. 3, the process begins by receiving 315 an item of user-generated content from a user. The item of user generated-content may be a post, comment, status message, and/or the like. For example, a user managing the fan page for a particular company may post information discussing a special deal available from the company. Upon receiving the item of user-generated content, the process automatically obtains 320 one or more machine-generated translations for the item of user-generated content in one or more target languages.

The process thereafter receives 325 a request for the item of user-generated content from a user. For example, the social networking system may receive a request for a fan page that includes the item of user-generated content. Upon receiving the request, the process retrieves the item of user-generated content. The process may retrieve the item of user-generated content from one or more of the stores of the social networking system 100.

In addition to retrieving the item of user-generated content, the process determines 330 that a translation corresponding to the item of user-generated content is required. In particular, the process may identify the source language for the item of user-generated content. The process may additionally identify the primary language for the user by determining language competency information for the user. Thereafter, the process may compare the user's primary language to the source language of the item. If the languages are different, the process determines that a translation is required.

If it is determined that a translation is required for the user, the process identifies 335 a translation to be provided to the user. The translation can translate the content item from the source language to the user's primary language. The translation may be identified from a set of translations stored in the translations store 247. In some instances, the identified translation is based on a quality rating for the translation. More specifically, a translation associated with the highest quality rating may be identified. The quality rating for the translation may be retrieved from the translations ratings store 248.

After identifying the translation, the process determines 340 whether the user is competent in the source language of the requested item of user-generated content based on the determined language competency information. By performing such a determination, the process can identify those users who may be suitable candidates for providing translations and/or voting on previously obtained translations for the item. If it is determined that the user is competent in the source language, the process provides 345, for display in a user interface, the item of user-generated content, the identified translation, and an input translation element to the user. The input translation element may enable the user to provide a translation and/or vote on previously obtained translations.

Figure 4:
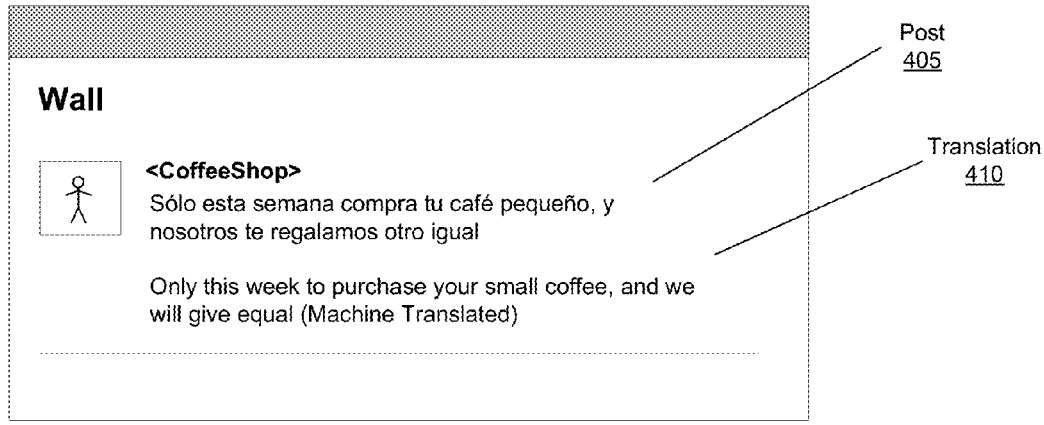
FIG. 4 illustrates an exemplary user interface that includes an item of user-generated content and a corresponding translation, in accordance with an embodiment of the invention.

Referring to FIG. 4, an exemplary user interface displayed to a user is shown. In FIG. 4, the user interface includes a wall post 405 posted by a user managing the fan page for a particular company, the <CoffeeShop>. As shown in FIG. 4, the wall post 405 was originally published to the wall of the fan page in the Spanish language. Directly below the post 405 is a translation 410 of the post in the English language, and an indication as to the source of the translation.

Figure 5:
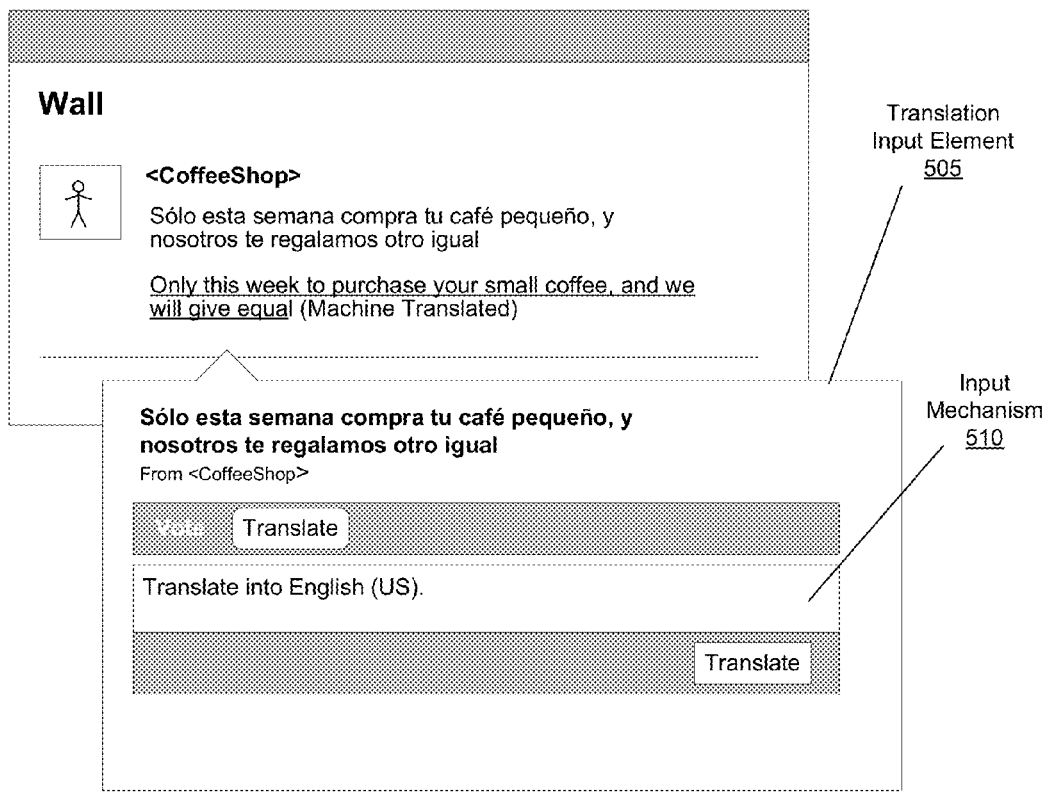
FIG. 5 illustrates an exemplary user interface that includes a translation input element for receiving a user provided translation, in accordance with an embodiment of the invention.

FIG. 5 illustrates the exemplary user interface including a translation input element. As shown in FIG. 5, the translation input element 505 includes an input mechanism 510 for receiving a translation from the user. In particular, the translation input mechanism 510 includes a text box for receiving a translation from the user. The text box additionally includes instructions indicating the target language for which the translation should be written. The indicated target language can be the primary language of the user, as determined previously. The input mechanism 510 may additionally include tools for drafting a translation, such as a spell-check tool, a grammar tool, and/or a thesaurus for various languages. As also shown in FIG. 5, the input mechanism 510 further includes a translate button. Upon completing a translation, the user can click on or otherwise interact with the translate button to have a translation corresponding to the item of user-generated content be sent to the social networking system 100.

Referring again to the process shown in FIG. 3, the process receives 350 a completed translation from the user. In one embodiment, the received translation may be stored in the translations store 247. Subsequently, the process receives 355 votes on the translation from one or more users associated with the social networking system. In particular, the one or more users may have requested the item of user-generated content. In response, the process may provide the item of user-generated content, a corresponding selected translation, and the translation input element. The one or more users may be provided with the translation input element based on a determination that each of the users is competent in the source language of the item of user-generated content.

In one embodiment, the translation input element includes a voting mechanism for voting on one or more previously obtained translation for the item of user-generated content. Each translation in the list (which includes in this example of translation previously received from the user) can translate the item of user-generated content into the primary language for each user. The votes provided by the one or more users can indicate the users' perceived quality of the translation. In general, a higher vote total indicates that a particular translation is of a higher perceived quality by the users associated with the social networking system 100.

Figure 6:
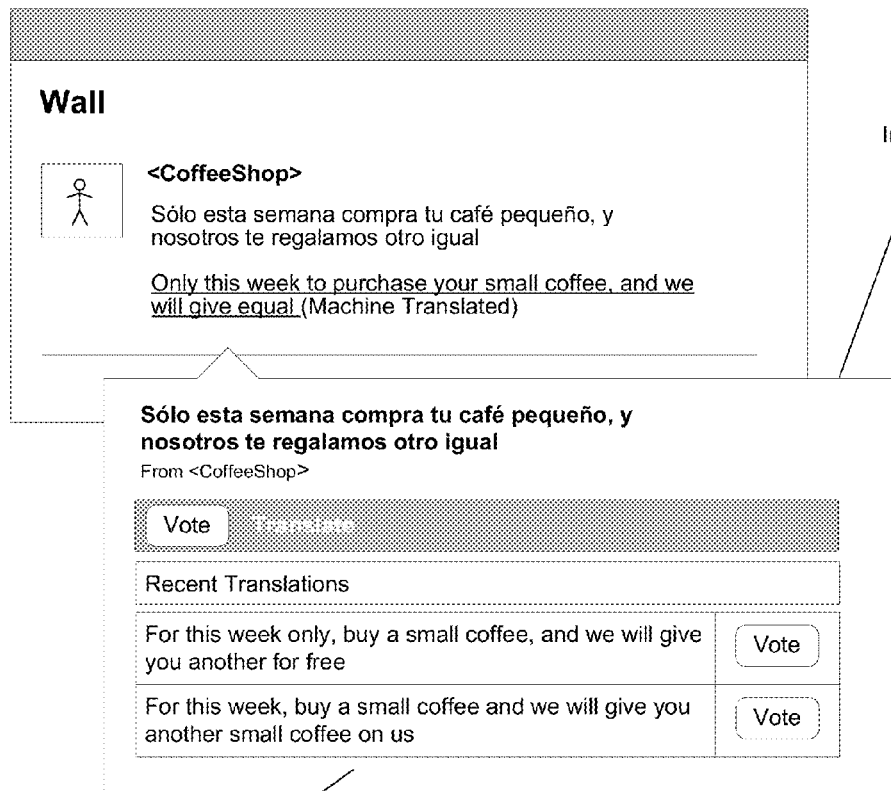
FIG. 6 illustrates an exemplary user interface that includes a translation input element for receiving votes, in accordance with an embodiment of the invention.

FIG. 6 illustrates an exemplary user interface that includes a translation input element, where the translation input element 505 includes a voting mechanism for voting on one or more translations. As shown in FIG. 6, the voting mechanism 605 includes a list of previously obtained translations for the item of user-generated content. The voting mechanism additionally includes a button corresponding to each translation in the list. A user may click on a button in order to vote for a particular translation. In one embodiment, the voting mechanism 605 may additionally include a button for users to flag an irrelevant or vulgar translation for review by an operator of the social networking system. This flagging feature may also include an option to indicate the reason for the flagging.

Referring again to the process shown in FIG. 3, based on the votes received from the one or more users, the process determines 360 a quality rating for the translation previously provided by the user. The quality rating can be used to select the translation for presentation to a subsequent viewer of the item of user-generated content. In one embodiment, the computed quality rating can be stored in the translations ratings store 248.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining whether a source language of an item of user-generated content is indicated by language competency information for a viewing user;
   responsive to a determination that the source language is indicated by the language competency information, providing a translation input element on a display, wherein the translation input element enables the viewing user to provide a user-generated translation of the item of user-generated content;
   adding the user-generated translation by the viewing user to a list of user-generated translations for the item of user-generated content received from a plurality of users associated with a social networking system, each user-generated translation having a number of votes indicating a reliability for the user-generated translation;
   selecting a user-generated translation for the item of user-generated content from the list, the selection comprising:
      upon a determination that a translation from an owner of the user-generated content for the item of user-generated content is in the list, selecting the translation from the owner for the item of user-generated content; and upon a determination that a translation from the owner of the user-generated content for the item of user-generated content is not in the list, selecting a user-generated translation having a highest number of votes from the list; and providing the selected user-generated translation for display to another viewing user.

2. The computer-implemented method of claim 1, wherein the reliability for the user generated translation is determined based at least in part on a quality rating, the quality rating being computed based at least in part on a plurality of votes received from a plurality of users, and on qualification information for the plurality of users.

3. The computer-implemented method of claim 2, wherein computing the quality rating includes weighting each vote in the plurality of votes, wherein the weight of each vote is determined based on the qualification information.

4. The computer-implemented method of claim 3, wherein the weight of each vote is further determined based on a relationship between a user providing the vote and the viewing user.

5. The computer-implemented method of claim 1, wherein the item of user-generated content is at least a user generated post or a user generated comment.

6. The computer-implemented method of claim 1, wherein the language competency information for the viewing user is determined based at least in part on one or more languages used in a user profile of the viewing user, language information indicated by the user profile of the viewing user, one or more languages used in content generated by the viewing user, one or more languages used by one or more connections of the viewing user, or one or more languages used in communications between the viewing user and the one or more connections of the viewing user.

7. The computer-implemented method of claim 1, providing for display an option comprises providing a user interface to the viewing user.

8. The computer-implemented method of claim 7, wherein providing the user interface to the viewing user comprises configuring the user interface to receive a translation for the text included in the item of user-generated content.

9. The computer-implemented method of claim 7, wherein providing the user interface to the viewing user comprises configuring the user interface to receive a vote for a previously obtained translation for the text included in the item of user-generated content.

* * * * *